United States Patent

Guillemain et al.

[11] Patent Number: 5,946,854
[45] Date of Patent: Sep. 7, 1999

[54] MODULAR SOILLESS GROWTH MEDIUM

[75] Inventors: Jean-Sylvain Guillemain, Palleau, 18120 Lury Sur Arnon; Françoise Guillemain, Lury Sur Arnon; Jean-Claude Bibollet, Thones, all of France

[73] Assignee: Jean-Sylvain Guillemain, Lury Sur Arnon, France

[21] Appl. No.: 09/000,024

[22] PCT Filed: Jul. 25, 1996

[86] PCT No.: PCT/FR96/01172

§ 371 Date: Jan. 21, 1998

§ 102(e) Date: Jan. 21, 1998

[87] PCT Pub. No.: WO97/04641

PCT Pub. Date: Feb. 13, 1997

[30] Foreign Application Priority Data

Jul. 28, 1995 [FR] France ................................. 9509399

[51] Int. Cl.⁶ .............................................. A01G 9/02
[52] U.S. Cl. ............................................ 47/65.9; 47/65.8
[58] Field of Search .................. 47/65.5, 65.9, 47/65.8, 59

[56] References Cited

U.S. PATENT DOCUMENTS

| | | | |
|---|---|---|---|
| 3,172,234 | 3/1965 | Eavis | 47/65.8 |
| 3,872,621 | 3/1975 | Greenbaum | 47/1.2 |
| 4,209,945 | 7/1980 | Dent et al. | 47/84 |
| 4,707,176 | 11/1987 | Durham | 71/23 |
| 5,171,390 | 12/1992 | Travers | 156/212 |
| 5,309,673 | 5/1994 | Stover et al. | 47/59 |
| 5,715,629 | 2/1998 | Hawkins | 47/65.5 |
| 5,761,847 | 6/1998 | Ito et al. | 47/65.8 |

FOREIGN PATENT DOCUMENTS

| | | | |
|---|---|---|---|
| 2067089 | 10/1993 | Canada | 47/59 CO |
| 230799 | 8/1987 | European Pat. Off. | |
| 573951 | 12/1993 | European Pat. Off. | 47/65.8 |
| 2356360 | 1/1978 | France | 47/65.8 |
| 2402401 | 4/1979 | France | |
| 2539000 | 7/1984 | France | 47/65.8 |
| 2630291 | 10/1989 | France | 47/59 CO |
| 2641442 | 8/1990 | France | |
| 2680948 | 3/1993 | France | |
| 2712140 | 5/1995 | France | |
| 2344935 | 4/1974 | Germany | 47/65.8 |
| 3244703 | 6/1994 | Germany | 47/65.8 |
| 1231821 | 9/1989 | Japan | |
| 1312933 | 12/1989 | Japan | 47/59 CO |
| 2186918 | 7/1990 | Japan | 47/59 CO |
| 403290523 | 12/1991 | Japan | 47/65.8 |
| 406007027 | 1/1994 | Jordan | 47/65.8 |
| 654600 | 6/1951 | United Kingdom | 47/59 CO |
| 94/22287 | 10/1994 | WIPO | |
| 094026093 | 11/1994 | WIPO | 47/65.8 |

*Primary Examiner*—Thomas Price
*Assistant Examiner*—Fredrick T. French, III
*Attorney, Agent, or Firm*—William H. Eilberg

[57] ABSTRACT

A growth medium consisting of a bag (1) containing a growth substrate (10). The bag (1) includes a bottom wall (11) made of an air and water-permeable material for retaining the growth substrate (10) during handling and transport. The upper wall (12) is secured to the bottom wall (11) around the edge (2) of the bag and consists of at least two superimposed sheets including a first sheet (13) made of a coarse mesh material enabling a decorative layer arranged on the medium at a later stage to be firmly attached thereto, and a second sheet (14) made of a material that is rapidly biodegradable on exposure to water and can temporarily retain the growth substrate (10) during handling and transport. A prefabricated modular medium with good decorative sheet retaining properties may thus be achieved.

13 Claims, 2 Drawing Sheets

MODULAR SOILLESS GROWTH MEDIUM

TECHNICAL FIELD OF THE INVENTION

The present invention concerns methods of soilless growth of plants using growth media in the form of bags containing a growth substrate that can be enriched with nutrients. The bags are placed side by side to constitute a mat on which the plants can grow.

The bags usually employed are made of impermeable plastics materials, for example as described in documents FR-A-2 402 401 and EP-A-0 230 799.

One possible use of such mats is to produce decorative flowerbeds in towns. It is then necessary to conceal the top surface of the bags by mulching, i.e. by laying down a decorative top layer. The problem is that the mulching top layer tends to slide over the smooth plastics material surface of the bag and, due to the progressive action of watering water or rain and wind, the bags are sooner or later uncovered, which is detrimental to the esthetics of the mat.

Document FR-A-2 680 948 describes a method of industrial manufacture of soilless growth mats in which a machine makes, in situ, a set of sleeves each made from strips of flexible material attached together at their lateral edges and containing a growth substrate. This document teaches cutting the sleeves to the required dimensions and then installing them at the required place. Transportation to and installation on a site are difficult because of the length of the sleeves. As the sleeves are not closed at their ends, substrate that is not retained by the roots can escape during transportation. The mulching layer is also easily blown away by the wind and carried away by surface water as it is not fixed to the mat, which is very smooth. The flexible material used transmits light and seedlings and does not oppose the premature growth of weeds. This method also requires costly, heavy and bulky tools that are difficult to use. It would seem virtually impossible to prefabricate the mats economically by this method. The same goes for the continuous sleeves of document WO-A-94 22287.

SUMMARY OF THE INVENTION

The invention proposes to design a new modular soilless growth medium based on bags that are easy to handle and contain a growth substrate and which of itself assures subsequent good retention of a mulching or decorative layer placed on the medium in use. The bags must be easy to handle so that they can be prefabricated and then transported to the site of use.

The problem is that the decorative layer is retained effectively only if the surface of the growth medium is highly irregular, preferably with direct contact between the mulch and the growth substrate, while manipulation and transportation of the bag necessitate a continuous and therefore smooth wall to prevent particles of the growth substrate escaping, which necessarily excludes subsequent direct contact between the mulch and the interior growth substrate.

To reconcile these contradictory requirements, the invention provides a bag having a special construction containing a growth substrate:

the bag has a bottom wall made of a material retaining the growth substrate during handling and transportation, the bag has a top wall attached to the bottom wall around the perimeter of the bag and formed of at least two associated materials comprising a wide-mesh first material adapted to assure good retention of a decorative layer subsequently placed on the medium and a second material that is rapidly biodegraded on exposure to water and temporarily blocks the mesh of said first material to retain the growth substrate temporarily during handling and transportation of the bag.

The second material can be chosen to degrade after 10 to 15 days of growth, for example.

In a first embodiment, the top wall is formed of at least two superposed sheets possibly sticked to each other comprising a wide-mesh first sheet of said first material and a second sheet of said rapidly biodegradable second material.

In a first variant, the first sheet forms the top wall outside layer. In this case the first sheet contributes to effective mechanical retention of the second sheet, which is generally more fragile because it is biodegradable.

In a second variant the second sheet forms the top wall outside layer. This favors access to inscriptions on the second sheet, for example for marking out planting areas.

The second sheet can advantageously be of paper, preferably of opaque paper that inhibits premature growth of weeds during the first period of use of the substrate until the paper degrades. The top wall can be impregnated with a fertilizer that can be transferred to the growth substrate by watering water or surface water.

In another embodiment the wide-mesh first material is covered with the rapidly biodegradable second material so that the top wall can be in the form of a single sheet.

The bag can advantageously be compartmented to limit displacement of the growth substrate during manipulation of the bag. A compartmented structure of this kind has specific advantages and can be used with single-material or two-material top walls.

The invention provides a soilless growth method using growth media of the above kind in the form of bags that can be manipulated independently of each other before and after the plants germinate.

BRIEF DESCRIPTION OF THE DRAWINGS

Other objects, features and advantages of the present invention will emerge from the following description of particular embodiments given with reference to the accompanying drawings, in which.

DESCRIPTION OF THE PREFERRED EMBODIMENTS

In the embodiments shown in the figures, the soilless growth medium of the invention is made up of bags designed to be placed side by side on the ground.

Figure 1:
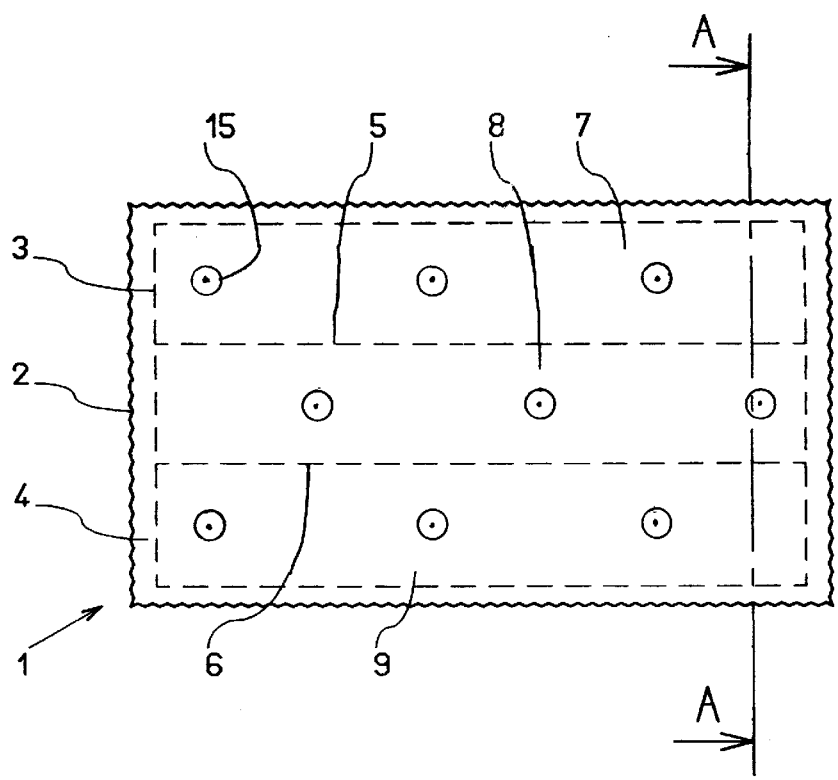
FIG. 1 is a top view of a modular soilless growth medium bag in accordance with one embodiment of the invention.

In the embodiment shown in FIG. 1, the bag 1 has a rectangular perimeter 2 formed of a top wall and a bottom wall attached together along a peripheral attachment line 3 slightly set in from the perimeter 2 to form a drip flap 4. In use, the drip flap 4 facilitates handling by providing a portion that is easy to grasp. Furthermore, the drip flap 4 assures partial overlapping of adjacent bags laid on the ground, preventing weeds growing between the bags.

The top and bottom walls are also fastened together along two intermediate longitudinal attachment lines 5 and 6 delimiting three compartments 7, 8 and 9 of substantially equal width. The bag can be approximately one meter long and approximately fifty centimeters wide, for example. The presence of compartments elongate in the longitudinal direction and relatively narrow in the transverse direction facilitates handling by limiting transverse displacement of the growth substrate contained in the bag 1. The width of the compartments 7–9 substantially corresponds to the appropriate distance between rows of plants. The length can be modified as required, and can be less than the width. Also, in some applications, transverse attachment lines can be added.

Bags as shown in the figures, with a length of about one meter and a width of about fifty centimeters, represent a good compromise from the handling point of view as the user can carry them with one longer longitudinal side across the chest and with the forearms under two intermediate portions of its bottom face, so that the bag does not tend to bend in an exaggerated manner.

Figure 2:
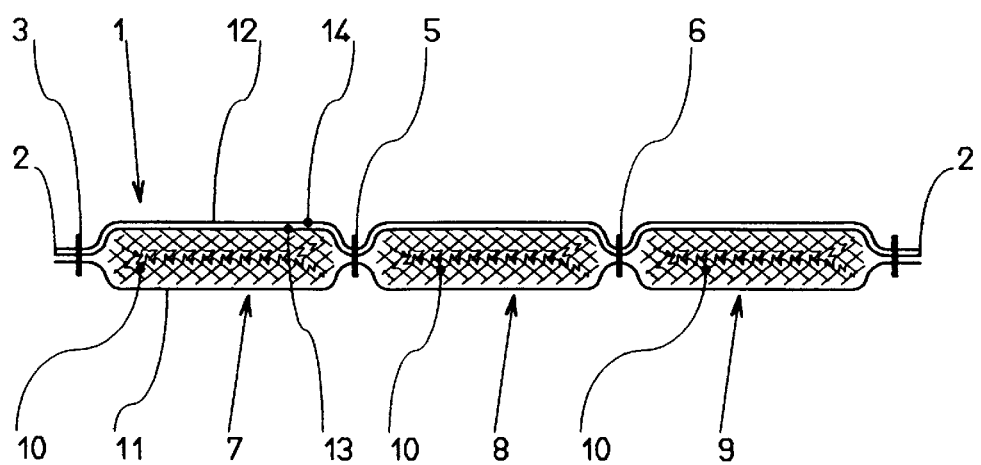
FIG. 2 is a view in cross-section to a larger scale taken along the line A—A in FIG. 1.

Referring to FIG. 2, the bag 1 contains in each of its compartments 7, 8 and 9 a growth substrate 10 consisting of enriched ground pine bark, for example. The bag 1 has a bottom wall 11 made from a material retaining the growth substrate 10 during handling and transportation of the bag 1. The material of the bottom wall 11 can advantageously be permeable to roots, for example a woven or non-woven material based on polypropylene or on a polyamide that gradually disintegrates when exposed to light.

The bag 1 has the top wall 12 attached to the bottom wall 11 around the perimeter 2 of the bag, preferably along the attachment line 3 slightly set in from the perimeter 2. In the embodiment shown, the top wall 12 is formed of at least two superposed sheets comprising a wide-mesh first sheet 13 and a second sheet 14 that is rapidly biodegraded on exposure to water. The first sheet 13 can assure good mechanical retention of a decorative layer subsequently placed on the medium. The second sheet 14 is adapted to retain the fine particles of growth substrate 10 temporarily during handling and transportation of the bag 1.

In the embodiment shown in FIG. 2 the second sheet 14 forms the outside layer of the top wall 12.

Figure 3:
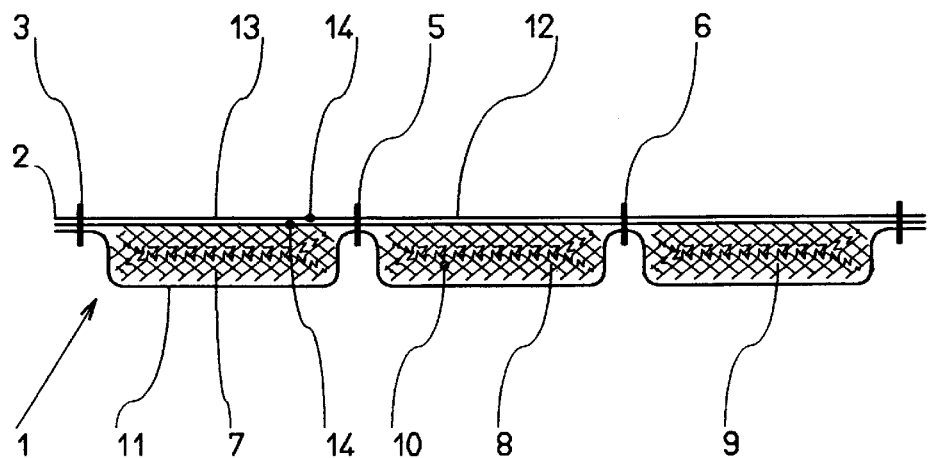
FIG. 3 is a cross-sectional view similar to FIG. 2 of another embodiment of the invention.

Alternatively, as shown in FIG. 3, the first sheet 13 can form the outside layer of the top wall 12.

The second sheet 14 can advantageously be of paper, preferably opaque paper such as kraft paper of approximately 60 g/M$^2$.

The outside face of the top wall 12 can carry planting markings such as the markings 15 shown in FIG. 1, defining one or more grids. For example, there can be a first series of five markings per bag, not shown in the figure, producing 10 planting sites per square meter, and a second series of nine markings per bag, as shown, producing eighteen planting sites per square meter.

In the FIG. 2 embodiment, the top wall 12 and the bottom wall 11 are substantially the same width. As a result the intermediate longitudinal attachment lines 5 and 6 are substantially in the median horizontal plane of the bag, i.e. in the middle of the thickness of the bag.

The top wall 12 or the bottom wall 11 is preferably wider and possibly longer so that the attachment lines such as the lines 3, 5 and 6 are substantially in the same plane as the narrower wall.

Accordingly, in the FIG. 3 embodiment, the bottom wall 11 is advantageously wider and possibly longer than the top wall 12 so that the intermediate longitudinal attachment lines 5 and 6 are in substantially the same plane as the narrower wall, i.e. the top wall 12, constituting a continuous top surface of the bag.

Alternatively, the top wall 12 can be wider and possibly longer than the bottom wall 11, the intermediate longitudinal attachment lines 5 and 6 then being in the bottom plane of the bag.

In either case, this favors a substantially constant thickness of the substrate 10, i.e. a thickness that is not reduced in the vicinity of the peripheral longitudinal attachment lines 3 and increased at the center of the bag 1. This substantially constant thickness prevents watering water running rapidly off the periphery of the bag 1 and thus favors its spreading over all of the top surface of the bag 1 and its absorption into the substrate 10. The presence of the intermediate attachment lines 5 and 6 which tend to form troughs on the top surface of the bag 1 also favors water retention, in particular with the troughs oriented transversely to the slope when used on sloping ground.

To improve the regularity of the thickness of the growth substrate contained in the bag 1, said bag 1 can advantageously be passed between two rollers, possibly vibrating rollers, rotating in opposite directions about parallel axes.

During handling of the bag 1, prior to use, the growth substrate 10 is correctly retained by the bottom wall 11 and by the continuous second sheet 14 of the second material of the top wall 12.

Figure 4:
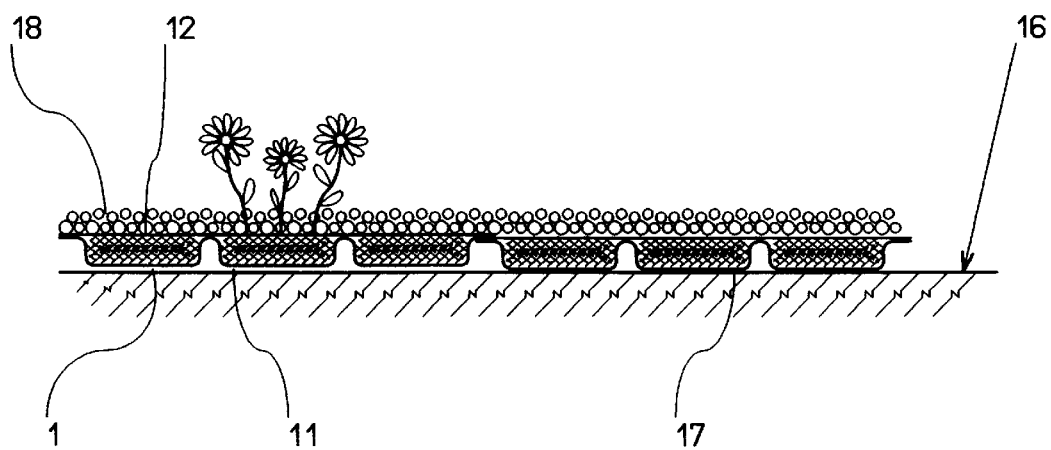
FIG. 4 shows the modular soilless growth medium of the invention in use.

In use, as shown in FIG. 4, the bag 1 is placed on the ground 16 side by side with other bags such as the bag 17. The ground 16 can be soil, a concrete or stone slab, a tarmacadam surface or any other mechanically strong surface. Surface water rapidly degrades the second sheet 14 of the second material of the top wall 12 as a result of which said top wall 12 then comprises only the wide-mesh first material first sheet 13. The decorative layer 18 disposed on the top wall 12 of the bag 1 is therefore correctly retained by the wide-mesh first material first sheet 13, which thus prevents the drawbacks of the prior art growth mats or bags.

The second material can be selected to degrade in 10 to 15 days. A first material the same color as the growth substrate 10 is preferably chosen to prevent it showing after the second material degrades. The first material and the bottom wall 11 can be non-biodegradable to enable handling of the growth medium after the plants germinate. However, depending on the application, the first material and/or the bottom wall 11 can be biodegradable over a longer period than the second material, this period being sufficiently long to enable the growth medium to be handled for an appropriate period after the plants have germinated.

Depending on the types of material used to make the bottom wall 11 and the top wall 12, the walls can be attached together along the attachment lines 3, 5 and 6 by sewing, gluing, clipping or welding.

To favor automatic production of the bags combined fastening means may advantageously be chosen, for example fastening by gluing along the intermediate longitudinal attachment lines 5 and 6 and along the longitudinal sections of the peripheral attachment line 3, and subsequent fastening by sewing along the transverse sections of the peripheral attachment line 3.

In the case of gluing, the intermediate longitudinal attachment lines 5 and 6 can have an increased width, for example in the order of 1 cm, enabling the bag to be cut along the middle of the attachment line without risk of the growth substrate escaping.

In the case of sewing, each of the intermediate longitudinal attachment lines 5 and 6 can comprise two parallel seams defining between them a strip that can be cut longitudinally.

Free spaces on the outside faces of the walls of the bag 1 can advantageously carry various inscriptions such as instructions for use, recommendations, precautions, markings, etc.

The present invention is not limited to the embodiments explicitly described but includes variants and generalizations thereof within the scope of the following claims.

We claim:

1. Bag for modular soilless growth medium, the bag (1) containing a growth substrate (10) wherein:

the bag (1) has a bottom wall (11) made of a material retaining the growth substrate (10) during handling and transportation, the bag (1) has a top wall (12) attached to the bottom wall (11) around the perimeter (2) of the bag (1) and formed of at least two associated materials comprising a wide-mesh first material (13) adapted to assure good retention of a decorative layer (18) subsequently placed on the medium and a second material (14) that is rapidly biodegraded on exposure to water and temporarily blocks the mesh of said first material (13) to retain the growth substrate (10) temporarily during handling and transportation of the bag (1), wherein the first material is made of a substance selected from the group consisting of non-biodegradable materials and materials which degrade more slowly than the second material.

2. Bag for modular soilless growth medium according to claim 1 wherein the top wall (12) is formed of at least two superposed sheets comprising a wide-mesh first sheet (13) of said first material and a second sheet (14) of said rapidly biodegradable second material.

3. Bag for modular soilless growth medium according to claim 2 wherein the first sheet (13) forms the outside layer of the top wall (12).

4. Bag for modular soilless growth medium according to claim 2 wherein the second sheet (14) forms the outside layer of the top wall (12).

5. Bag for modular soilless growth medium according to claim 2 wherein the second sheet (14) is of opaque paper.

6. Bag for modular soilless growth medium according to claim 2 wherein the two sheets (13, 14) are glued together.

7. Bag for modular soilless growth medium according to claim 1 wherein the wide-mesh first material (13) is coated with the rapidly biodegradable second material (14).

8. Bag for modular soilless growth medium according to claim 1 wherein the top wall (12) is impregnated with a fertilizer that can be transferred to the growth substrate (10) by watering or surface water.

9. Bag for modular soilless growth medium according to claim 1 wherein the outside face of the top wall (12) has planting markings (15) in one or more grids.

10. Bag for modular soilless growth medium according to claim 1 wherein the bag (1) has a rectangular perimeter (2), the top wall (12) and the bottom wall (11) being fastened together along a peripheral attachment line (3) slightly set in from the perimeter (2) to form a drip flap (4).

11. Bag for modular soilless growth medium according to claim 10 wherein the top wall (12) and the bottom wall (11) are also fastened together along two intermediate longitudinal attachment lines (3, 5) delimiting three compartments (7, 8, 9).

12. Bag for modular soilless growth medium according to claim 11 wherein one of the top wall (12) and the bottom wall (11) is wider than the other, and one of the top wall and the bottom wall is narrower than the other, so that the attachment lines (3, 5, 6) are in substantially the same plane as the narrower wall.

13. Soilless growth method comprising the steps of placing plants on a plurality of bags for modular soilless growth media made according to claim 1, and handling said bags independently of each other before and after the plants germinate.

* * * * *

UNITED STATES PATENT AND TRADEMARK OFFICE
CERTIFICATE OF CORRECTION

PATENT NO : 5,946,854
DATED : September 7, 1999
INVENTOR(S): Jean-Sylvain Guillemain et al It is certified that error appears in the above-identified patent and that said Letters Patent is hereby corrected as shown below:

On the cover page, under FOREIGN PATENT DOCUMENTS, second column, line 16, please delete "Jordan", and insert instead -- Japan --

Signed and Sealed this

Fifth Day of September, 2000

Attest:

Attesting Officer

Q. TODD DICKINSON
Director of Patents and Trademarks